United States Patent Office 3,108,134
Patented Oct. 22, 1963

---

3,108,134
METALLOMETALLIC SALT OF UNSATURATED CARBOXYLIC ACID
David O. De Pree, Baton Rouge, La., and Irwin J. Pachter, Erdenheim, Pa., assignors to Ethyl Corporation, New York, N.Y., a corporation of Virginia
No Drawing. Filed Oct. 16, 1959, Ser. No. 846,819
15 Claims. (Cl. 260—515)

This invention relates to novel organometallic compounds and in particular is concerned with the preparation of metallo substituted metallic salts of unsaturated carboxylic acids.

The compounds of this invention are unique, stable, alkali and alkaline earth metal substituted, metallic salts of unsaturated carboxylic acids, having a structure which provides for intramolecular movement of labile electrons resulting in resonance stabilization. These characteristics provide a significant departure from heretofore known unsaturated organo alkali and alkaline earth metal compounds.

It is an object of this invention to provide resonance stabilized metallo substituted metallic salts of unsaturated carboxylic acids. A further object is to provide these compositions in high yields and purity. Another object is the provision of a process for the manufacture of the novel compounds of the instant invention.

The above and other objects of this invention are accomplished by providing, as a new composition of matter, a metallometallic salt of an unsaturated carboxylic acid in which the carbon atom of the carboxyl group is linked to the metallo substituted carbon atom through an unsaturated bivalent hydrocarbon linking group, said unsaturated group involving only carbon to carbon double bonding. The unsaturated group is generally a hydrocarbon radical containing 2 through 14 unsaturated carbon atoms—involved in carbon to carbon double bonding only as opposed to carbon to carbon triple bonding—said carbon atoms being positioned contiguously with respect to each other. Thus, the unsaturated bivalent linking groups are selected from the class consisting of bivalent vinylene groups, bivalent conjugated olefin groups and bivalent aromatic groups. By bivalent vinylene groups is meant groups having the formula

wherein R is as defined hereinafter and, preferably, hydrogen or an alkyl hydrocarbon group containing about 1 to about 6 carbon atoms.

Thus, within the scope of the instant invention, and one of the embodiments thereof, is a metallometallic salt of a carboxylic acid wherein the carbon of the carboxyl group is linked to the metallo substituted carbon atom through an unsaturated bivalent linking group selected from the class consisting of a vinylene group and a conjugated olefin group. The metallo substituent of said carboxylic acid is selected from the class consisting of alkali and alkaline earth metals. Illustrative of this embodiment is the compound gamma-sodio-sodium crotonate.

Another embodiment of the instant invention is a composition of matter comprising a metallometallic salt of a carboxylic acid, wherein the carbon of the carboxyl group is linked to the metallo substituted carbon atom through a bivalent aromatic group, said metallo substituent of said carboxylic acid being selected from the class consisting of alkali and alkaline earth metals. Illustrative of this embodiment is the compound α-sodio-sodium-p-toluate.

The novel compounds of the instant invention can be more fully illustrated by the following general formula

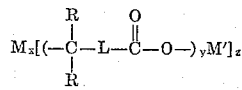

wherein M is a metal selected from the class consisting of alkali and alkaline earth metals, M' is a metal of the Periodic Chart of the Elements (Fisher Scientific Company, 1955), L is an unsaturated bivalent hydrocarbon linking group—involved in carbon to carbon double bonding only—selected from the class consisting of vinylene groups, conjugated olefins and aromatic groups, $x$ and $y$ are integers, each equal to the valence of the metal M', and $z$ is an integer equal to the valence of M. The integers $x$ and $z$ are further defined as (1) the lowest common integer divisible by both $x$ and $z$ and (2) a multiple of said lowest common integer. R represents groups unreactive with alkali metal amides, alkaline earth metal amides, alkali metal hydrides, alkaline earth metal hydrides, alkali metals and alkaline earth metals at a temperature up to the decomposition temperature of the unsaturated carboxylic acids of this invention. (R will be defined more fully hereinafter.)

Also within the scope of the instant invention, and forming a preferred embodiment thereof, are the compounds represented by the following general formula

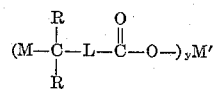

wherein M is an alkali metal, M' is a metal of the periodic chart of the elements, L, is an unsaturated bivalent linking group, such as defined hereinbefore; $y$ is an integer having a valence equal to the valence of the metal M', R represents hydrocarbon groups which can be the same or different. (R is more fully defined hereinafter.)

The novel compositions of this invention have the characteristic of being stable at elevated temperatures. This is particularly the case with the compounds gamma-sodio-sodium crotonate, α-sodio-sodium-p-toluate and α-sodio-sodium-orthotoluate. This high temperature stability, coupled with the fact that the compounds of this invention, in general, are brightly colored solid materials, is highly indicative that these compositions are resonance stabilized structures which provide for intra-molecular movement of labile electrons. Furthermore, although compounds of the instant invention are thermally stable, they exhibit high reactivity, a factor which becomes advantageous in rendering the compounds of this invention of considerable utility in various reactions. Another factor contributing to the value of these compositions is that the metallometallic salts of unsaturated carboxylic acids are obtained essentially free of other organometallic compounds. This is a significant advantage, since many organometallics could not be readily separated from the desired product and would, therefore, hinder—by competing reactions—many processes in which the compounds of this invention can be employed.

In general, the new compositions of matter of the instant invention are produced by reacting a metallic salt of an unsaturated carboxylic acid, in which the carbon atom of the carboxyl group is linked to a carbon atom containing at least one hydrogen atom through an unsaturated hydrocarbon bivalent linking group—said unsaturated group involving carbon to carbon double bonding only—selected from the class consisting of vinylene groups, conjugated olefin groups and aromatic groups, with a metal-containing compound selected from the group consisting of alkali or alkaline earth metal amides, alkali or alkaline earth metal hydrides and alkali or alkaline earth metals.

In the following working examples the process of this invention and the compounds produced thereby are more fully demonstrated.

Example I demonstrates a reaction between sodium crotonate and sodium amide to produce a bright yellow product. This product, upon reaction with benzyl chloride gives an isomeric mixture of the sodium salts of 5-phenyl-2-pentenoic acid and 2-benzyl-2-butenoic acid.

*Example I*

Sodium crotonate (10.8 parts) and 3.9 parts of sodium amide were carefully premixed under a nitrogen atmosphere. This mixture was thereafter fed into a reaction vessel, preheated to a temperature of approximately 190° C., provided with means for charging, heating, stirring and, additionally, provided with fittings for inlet and outlet of nitrogen. During the addition ammonia was continuously evolved. The temperature was maintained on the system until ammonia evolution has ceased. Thereafter the system was cooled to about 25° C. and the bright yellow product thereafter discharged from the reaction vessel. This product was then reacted at about 130° C. with benzyl chloride to produce, upon acidification, 5-phenyl-2-pentenoic acid and 2-benzyl-2-butenoic acid. The bright yellow product is thereby demonstrated to be a mixture of the two contributing structures, gamma-sodio-sodium crotonate and α-sodio-sodium vinyl acetate.

*Example II*

Sodium para-toluate (5 parts) and 1.3 parts of sodium amide were premixed and thereafter fed to a reaction vessel, preheated to a temperature of approximately 200° C., and provided with means for heating, charging, stirring, and gas inlet and outlet means. During the addition period, and the reaction period, ammonia was continuously evolved. Upon the cessation of ammonia evolution the reaction system was allowed to cool to approximately 25° C. and the navy blue reaction product discharged from the reaction vessel. This product, upon treatment with carbon dioxide, yielded the disodium salt of homoterephthalic acid, demonstrating that the navy blue product formed in the reaction was α-sodio-sodium p-toluate.

*Example III*

This example demonstrates producing the products of the instant invention in a grinding and mixing operation. The apparatus employed was a standard ball mill provided with means for gas inlet and outlet and means for heating. Into the nitrogen swept reaction vessel was added 79.2 parts of sodium p-toluate and 11.5 parts of sodium. The reaction mixture was brought to a temperature of approximately 170° C. whereupon hydrogen evolution commenced. The reaction was allowed to run between the temperature of 170° and 223° C. for a period of 6½ hours during which time hydrogen continuously evolved. At the end of this period hydrogen evolution ceased and the reaction mixture was allowed to cool to approximately 25° C. The blue-black reaction product was discharged from the ball mill reaction vessel. This product was identified, in the same manner as Example II, as α-sodio-sodium p-toluate in 83 percent yield.

*Example IV*

The process of Example II is employed with the exception that 158.4 parts of sodium ortho-toluate and 39 parts of sodium amide were employed. In this manner α-sodio-sodium ortho-toluate was produced in good yields. The product was a brick-red solid.

*Example V*

In the process of Example I are employed essentially equimolar parts of sodium salt of 1-carboxy-4-methyl naphthalene and sodium amide. The product thereby produced is the sodium salt of 1-carboxy-4-(sodio methylene) naphthalene.

*Example VI*

Equimolar proportions of the sodium salt of 2,4-hexanoic acid and sodium amide are reacted, as in the process of Example II, to produce the sodium salt of 6-sodio 2,4-hexanoic acid. Reaction temperatures of between 140 and 200° C. are utilized.

*Example VII*

Employing the procedure of Example I, with the exception that 2 moles of potassium crotonate and 1 mole of magnesium hydride are employed in place of sodium crotonate and sodium amide, gamma-magnesio-potassium crotonate is produced in good yield.

*Example VIII*

Employing the process of Example II, utilizing 1 mole of calcium toluate and 2 moles of lithium hydride in place of sodium toluate and sodium amide, lithio-calcium para-toluate is produced in good yield.

The above working examples are presently preferred modes of carrying out the instant invention. However, the scope of this invention should not be limited thereby, as other metallometallic salts of unsaturated carboxylic acids can be produced by similarly reacting metal amides, metal hydrides or alkali and alkaline earth metals with other salts of an unsaturated carboxylic acid. Thus, for example, when the potassium salt of 1-carboxy-4-methyl anthracene is reacted with lithium metal, the potassium salt of 1-carboxy-4-(lithio methylene) anthracene is formed; upon reaction of the lithium salt of 3-methyl-4-carboxy fluorene with calcium amide, the lithium salt of 3-(calcio methylene)-4-carboxy fluorene is formed; when the magnesium salt of 1-carboxy-4-methyl tetralin is reacted with sodium hydride, the magnesium salt of 1-carboxy-4-(sodio methylene) Tetralin is formed; reaction of the calcium salt of 2-methyl-3-ethyl benzoate with sodium metal forms calcium 2-(sodio methylene)-3-ethyl benzoate; when lead di-α-methyl crotonate is reacted with lithium hydride, lead α-methyl gamma-lithio crotonate is formed; upon reacting barium sorbate with calcium metal, barium-6-calcio sorbate is formed; and when sodium senecioate is reacted with calcium hydride, gamma-calcio sodium senecioate is formed.

The metallometallic salts of unsaturated carboxylic acids of this invention can be substituted or unsubstituted carboxylic acids. Illustrative of an unsubstituted metallometallic salt of an unsaturated carboxylic acid is gamma-sodio sodium crotonate

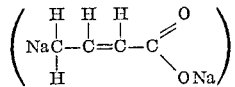

When substituted the substituents are preferably hydrocarbon groups containing between about 1 and 20 carbon atoms. Furthermore, the carboxylic acids of this invention can be substituted with substituents which are inert to the reactants employed in producing the novel compositions of this invention. Thus, in general, any substituent which is unreactive with alkali and alkaline earth metal amides, alkali and alkaline earth metal hydrides and alkali and alkaline earth metals at tempertures below the decomposition temperture of the unsaturated metallo metallic salt of a carboxylic acid product can be included within the scope of substituents. Illustrative of such substituents are the following groups: nitrosyl, ether linkages, keto, mercapto, nitroso, alkyl thio, sulfino, sulfate, tertiary amino, dialkyl phosphino, and the like. Gamma-sodio-gamma-phenyl sodium crotonate

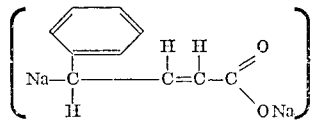

and gamma-sodio-beta-nitroso sodium crotonate

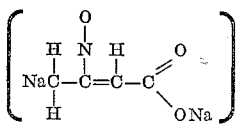

are exemplary of substituted unsaturated metallometallic carboxylic acids.

Other compounds within the scope of this invention will now appear to one skilled in the art by reference to the above general formulas and the following discussion.

In the above formulas R is further defined as hydrogen or a hydrocarbon group—containing about 1 through 20 carbon atoms—such as the alkyl radicals methyl, ethyl, isopropyl, n-butyl, tertiary butyl, n-amyl, eicosyl and various positional isomers thereof—as for example 2-methyl butyl. R can also be alkenyl radicals such as ethenyl, propenyl, butenyl and the corresponding branched chain isomers thereof. R can further be defined as an aromatic group such as phenyl, naphthyl and the like. Aralkyl groups such as benzyl, 2-phenyl propyl are also included within the scope of the hydrocarbon group R. When R is an alicyclic hydrocarbon group, cycloalkyl and cycloalkenyl groups are included. Examples of these groups are cyclopropyl, cyclobutyl, cycloamyl, cyclohexyl, 1-cyclohexyl ethenyl, 3-cyclooctyl propenyl and the like. In general, it is preferred that R be a hydrocarbon group containing between about 1 and 7 carbon atoms. In addition to the hydrocarbon groups, which are preferred groups represented by the symbol R in the foregoing formulas, R can be any group inert to the reactants utilized in producing the unsaturated metallo metallic salt of a carboxylic acid of this invention. Such groups have been defined hereinbefore.

The metal M' can be a metal of the periodic table and thus includes such metals as lithium, sodium, potassium, rubidium, cesium, francium of group I-A; beryllium, magnesium, calcium, strontium, barium, radium of group II-A; scandium, yttrium, lanthanum (including the lanthanum series), actinium (including the actinium series), of group III-B; titanium, zirconium, hafnium, of group IV-B; vanadium, niobium, tantalum, of group V-B; chromium, molybdenum, tungsten of group VI-B; manganese, technetium, rhenium of group VII-B; iron, ruthenium, osmium, cobalt, rhodium, iridium, nickel, palladium, platinum of group VIII; copper, silver, gold of group I-B; zinc, cadmium, mercury of group II-B; aluminum, gallium, indium, thallium of group III-A; germanium, tin, lead of group IV-A; antimony, bismuth of group V-A; polonium of group VI-A. M' can also be, in some instances, a metalloid such as boron, silicon and the like.

It is preferred that the metal M' be a metal from the groups I-A through IV-A of the periodic table. Thus, the groups I-A through III-A, I-B through VIII-B and group VIII are included within this preferred class. These metals are preferred since they more easily form metal salts with carboxylic acids. Because of their favorable economics, the alkali and alkaline earth metals form an especially preferred group comprising the metal M'.

M is an alkali or alkaline earth metal such as lithium, sodium, potassium, rubidium, cesium, francium, beryllium, magnesium, calcium, strontium, barium and radium. In general the alkali metals are preferred. Sodium is especially preferred because of its availability, reactivity and favorable economics.

L is an unsaturated bivalent hydrocarbon linking group—e.g. vinylene group, bivalent aromatic group or bivalent conjugated olefin group. As a bivalent aromatic group L includes the condensed ring systems, and is derived by removal of two hydrogen atoms from the aromatic ring; L as a bivalent conjugated olefin is derived by removal of a hydrogen atom from each of the terminal carbon atoms, e.g.

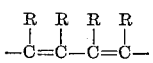

(R as defined hereinbefore and, preferably, hydrogen or lower alkyl radicals—i.e. 1 to 6 carbon atoms). Bivalent groups derived from benzene, naphthalene, anthracene, butadiene, hexatriene, octatetraene, and the lower alkyl substituted derivatives thereof, are illustrative of the aromatic and olefin groups represented by the symbol L in the aforementioned formula.

The metal amides employed as a reactant in the process of this invention are more fully illustrated by the formula

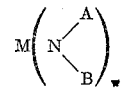

wherein M can be the same as or different from M' and is an alkali or alkaline earth metal, A and B can be the same or different and are selected from the group consisting of hydrogen and lower alkyl radicals, and $w$ is a small whole number.

These metal amide derivatives are readily prepared by reacting an amine with the metal in the presence of a conjugated polyene. For example, n-sodium propyl amide is prepared by reacting n-propyl amine with finely divided sodium in the presence of butadiene. In general, it is preferred to employ lower alkyl radicals which form an amine derivative which boils at about 100° C. or less and is relatively stable under reaction conditions. Thus, for example, A or B can be the radicals methyl, ethyl, isopropyl, propyl, and the like. The use of the amines or substituted amines which will result in a derivative having a boiling point below about 100° C. and being comparatively stable under reaction conditions is preferred since the derivative can be readily removed from the reaction mixture rapidly. Rapid removal of the derivative maintains the course of the reaction toward the formation of the metallo metallic organic salt.

The metal substituent of the metal hydrides employed as reactant in this invention conform to the definition of M defined hereinbefore. Thus, exemplary of other metallic hydrides which can be employed in place of sodium hydride in the foregoing examples are potassium hydride, rubidium hydride, cesium hydride, magnesium hydride, calcium hydride, lithium hydride, barium hydride, aluminum hydride, and the like.

When a metal is employed as a reactant in the process of this invention, the metal can be an alkali or alkaline earth metal such as those defined hereinbefore.

In general we conduct our process at a temperature sufficient to initiate reaction—as indicated by the commencement of gas evolution—and no higher than the decomposition temperature of the product produced. Termination of the reaction is indicated by the cessation of gas evolution. The process of this invention is preferably conducted from a temperature of about 140° C. up to the decomposition temperature of the product produced. Temperatures within the range of about 160° C. to about 200° C. are most preferred. Best results are generally obtained when the reaction is conducted at temperatures below about 250° C. but no lower than that temperature at which gas evolution commences.

An excess of either reactant can be employed. However, if an excess of one of the reactants is employed, it is preferable that the metallic salt of the unsaturated carboxylic acid be in excess, so that the metal amide or hydride will be essentially quantitatively consumed. In this manner, the product obtained may contain some metal salt of the carboxylic acids, but this impurity has not been found detrimental in subsequent use of the metallo metallic salts of the unsaturated carboxylic acids of this invention. In an especially preferred embodiment, essentially stoichiometric quantities of the reactants are employed.

The particle size of the reactants is important. In general, it is preferred to employ particle sizes below about 50 microns. By using smaller particle size, shorter reaction periods are obtained. The reactants can be premixed and fed continuously to a heated surface. This is the preferable operation since more efficient comminution of the reactants is obtained. Generally, however, when a metallic hydride is employed the reactants are contacted in a reaction vessel and heat applied. It should be understood that the reactants need not be pre-ground or premixed, but can be fed to the reactor separately in larger particle sizes and mixed and ground in situ. This is particularly true when the agitation provided in the reactor is of the type to provide grinding of the reaction mixture during the course of the reaction. Employing the technique of the grinding along with the agitation enhances the contact between the reactants, thus providing more complete reaction. One suitable method of obtaining this objective is to employ a ball mill as a reactor. Other apparatus can be employed which will be evident to those skilled in the art.

The reaction should be conducted in an inert atmosphere such as argon, nitrogen, krypton, and the like. It is preferable that the inert atmosphere be pre-purified so as to be substantially free of impurities such as oxygen and moisture, since these impurities may be taken up in the product. Although the reaction is generally run in the dry state, for some purposes it is desirable to conduct the reaction under an inert liquid blanket. One of the purposes of such an embodiment is to avoid oxygen contamination by impurities in the flushing gas. The inert liquid blanket employed is generally a high boiling hydrocarbon oil, such as mineral oil.

The reaction is generally conducted at atmospheric or sub-atmospheric pressures. Sub-atmospheric pressures have the advantage of enhancing removal of the volatile by-product thus obtaining more rapid reaction and more complete shifting of the equilibrium. Pressures from about atmospheric up to about 33.3 atmospheres can be employed.

The process of this invention is admirably suited to continuous methods. For example, the reactants separately or together in the proper proportions are continuously ground to desired particle size, transmitted to a heated movable reactor surface, the volatile by-product is removed and recovered for recycling to the preparation of the metal amide or derivative thereof, and the product is continuously discharged from the reactor. This and other modifications will be evident to those skilled in the art.

The novel products of this invention are provided in essentially purified form thereby permitting their utility in a variety of chemical reactions without the hindrance of competing reactions which result in the formation of impurities in the final products.

Thus when the metallo metallic salts of an unsaturated carboxylic acid of this invention are reacted with organo monohalides, the corresponding acid is produced, upon acidification, in high purity and yields. The following example demonstrates this utility.

*Example IX*

The gamma-sodio sodium crotonate formed from the reaction of 65 parts of sodium crotonate with 19.5 parts of sodium amide, at 142–190° C., was suspended in 200 ml. of heavy aviation alkylate in a vessel provided with means for stirring, a condenser, nitrogen atmosphere and means for liquid addition. Benzyl chloride (40 parts) was charged to the vessel and the temperature raised to 130° C. where a vigorous reaction set in, turning the yellow-red solids white. These solids were then recovered and found to be a mixture of sodium 5-phenyl-2-pentenoate and sodium 2-benzyl vinyl acetate.

A further utility of the compounds of this invention is their reaction with carbon dioxide to produce, upon acidification, dibasic acids. The following example demonstrates more fully this utility.

*Example X*

The product produced by reaction in a ball mill (such as described in Example III) of 79.2 parts of sodium o-toluate and 11.5 parts of sodium metal, at 170–190° C., was treated in situ with carbon dioxide at 134–142° C. for a period of 5½ hours. The product recovered was hydrolyzed with water ad acidified, and 6.5 parts of unreacted o-toluic acid filtered off. The filtrate was concentrated and cooled to give homophthalic acid in approximately 45 percent yield. This was recrystallized from diethyl ether. The melting point of the recrystallized product was 178° C. (lit. 180–181°, Davies and Poole, J. Chem. Soc. 1616 (1928)).

When the above working example is repeated using α-sodio-sodium-p-toluate in place of α-sodio-sodium-o-toluate, homoterephthalic acid is obtained in good yield.

We claim:
1. A metallometallic salt of an unsaturated carboxylic acid in which the carbon atom of the carboxyl group is directly linked to the metallo substituted carbon atom through an unsaturated bivalent hydrocarbon linking group, said unsaturated group (a) containing from about 2 to about 14 carbon atoms, (b) being selected from the group consisting of vinylene groups, conjugated olefin groups and arylene groups, and (c) involving only carbon to carbon double bonding; said metallo and metallic substituents of said carboxylic acid being selected from the class consisting of alkali and alkaline earth metals.
2. The composition of claim 1 wherein said metallo and said metallic elements are alkali metals.
3. The composition of claim 1 wherein said metallo and said metallic elements are sodium.
4. A metallometallic salt of a carboxylic acid wherein the carbon of the carboxyl group is directly linked to the metallo substituted carbon atom through the carbon atoms of a vinylene group, said vinylene group containing from about 2 to about 14 carbon atoms, and said metallo substituent of said carboxylic acid being selected from the group consisting of alkali and alkaline earth metals.
5. The composition of claim 4 wherein said metallo and said metallic elements are alkali metals.
6. The composition of claim 4 wherein said metallo and said metallic elements are sodium.
7. A metallometallic salt of a carboxylic acid wherein the carbon of the carboxyl group is directly linked to the metallo substituted carbon atom through the carbon atoms of a conjugated olefin group, said olefin group containing from 4 to about 14 carbon atoms, and said metallo substituent of said carboxylic acid being selected from the group consisting of alkali and alkaline earth metals.
8. The composition of claim 7 wherein said metallo and said metallic elements are alkali metals.
9. The composition of claim 7 wherein said metallo and said metallic elements are sodium.
10. A metallometallic salt of a hydrocarbon carboxylic acid wherein the carbon of the carboxyl group is directly linked to the metallo substituted carbon atom through the ring carbon atoms of an arylene group, said arylene group containing from 6 to about 14 carbon atoms, and said metallo and metallic elements being selected from the group consisting of alkali and alkaline earth metals.
11. The composition of claim 10 wherein said metallo and said metallic elements are alkali metals.
12. The composition of claim 10 wherein said metallo and said metallic elements are sodium.
13. Alpha-sodio-sodium-o-toluate.
14. Alpha-sodio-sodium-p-toluate.
15. A mixture of gamma-sodio-sodium crotonate and alpha-sodio-sodium vinyl acetate.

No references cited.